United States Patent
Bai et al.

(10) Patent No.: US 12,022,476 B2
(45) Date of Patent: Jun. 25, 2024

(54) BEAMFORMING IN MULTICAST COMMUNICATIONS

(71) Applicant: QUALCOMM Incorporated, San Diego, CA (US)

(72) Inventors: Tianyang Bai, Somerville, NJ (US); Wooseok Nam, San Diego, CA (US); Sungwoo Park, Seoul (KR); Jung Ho Ryu, Fort Lee, NJ (US); Kiran Venugopal, Raritan, NJ (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 827 days.

(21) Appl. No.: 17/098,653

(22) Filed: Nov. 16, 2020

(65) Prior Publication Data
US 2021/0153239 A1 May 20, 2021

Related U.S. Application Data

(60) Provisional application No. 62/938,105, filed on Nov. 20, 2019.

(51) Int. Cl.
*H04W 72/23* (2023.01)
*H04B 7/06* (2006.01)
(Continued)

(52) U.S. Cl.
CPC .......... *H04W 72/23* (2023.01); *H04B 7/0617* (2013.01); *H04L 12/189* (2013.01); *H04L 69/324* (2013.01); *H04W 72/121* (2013.01)

(58) Field of Classification Search
CPC . H04W 72/23; H04W 72/121; H04W 72/046; H04W 72/30; H04B 7/0617;
(Continued)

(56) References Cited

U.S. PATENT DOCUMENTS

| 11,211,983 B2* | 12/2021 | Rune .................... H04B 7/0695 |
| 2018/0199371 A1* | 7/2018 | Srinivasan ................ H04L 1/18 |
| 2020/0137803 A1* | 4/2020 | Fakoorian ......... H04W 74/0833 |

FOREIGN PATENT DOCUMENTS

| WO | WO-2019099659 A1 | 5/2019 |
| WO | WO-2019202106 A1 | 10/2019 |

OTHER PUBLICATIONS

Samsung: "Multi-beam Transmission for NR-PDCCH", 3GPP Draft; R1-1707987, XP051273184 (Year: 2017).*

(Continued)

*Primary Examiner* — Hardikkumar D Patel
(74) *Attorney, Agent, or Firm* — Kevin M. Donnelly; Harrity & Harrity, LLP

(57) ABSTRACT

This disclosure provides methods, devices and systems for beamforming in wireless communications. Some implementations more specifically relate to beamforming configurations for multicast communications. A transmitting device may transmit multicast data to multiple receiving devices, concurrently, via a physical downlink shared channel (PDSCH). The PDSCH may be preceded by a physical downlink control channel (PDCCH). The PDCCH may provide scheduling information for the PDSCH, including a multicast beam associated with the PDSCH and a timing offset or delay between the PDCCH and the PDSCH. A receiving device may determine that the PDSCH contains multicast data based on an indication in the PDCCH. To receive the PDSCH, each receiving device may tune its antennas in a direction of the scheduled multicast beam or a default beam based on the delay between the PDCCH and the PDSCH.

30 Claims, 11 Drawing Sheets

(51) Int. Cl.
  *H04L 12/18* (2006.01)
  *H04L 69/324* (2022.01)
  *H04W 72/121* (2023.01)
(58) Field of Classification Search
  CPC ..... H04B 7/088; H04B 7/0695; H04L 12/189; H04L 69/324; H04L 5/0053; H04L 5/0023
  See application file for complete search history.

(56) References Cited

OTHER PUBLICATIONS

International Search Report and Written Opinion—PCT/US2020/060841—ISA/EPO—dated Feb. 16, 2021.
Samsung: "Multi-Beam Transmission for NR-PDCCH", 3GPP TSG RAN WG1 Meeting #89, 3GPP Draft; R1-1707987 Multi-Beam Transmission for NR-PDCCH, 3rd Generation Partnership Project (3GPP), Mobile Competence Centre, 650, Route Des Lucioles; F-06921 Sophia-Antipolis Cedex; France, vol. RAN WG1, No. Hangzhou, China; May 15, 2017-May 19, 2017, May 14, 2017 (May 14, 2017), pp. 1-7, XP051273184, Retrieved from the Internet: URL: http://www.3gpp.org/ftp/Meetings_3GPP_SYNC/RAN1/Docs/ [retrieved on May 14, 2017].

* cited by examiner

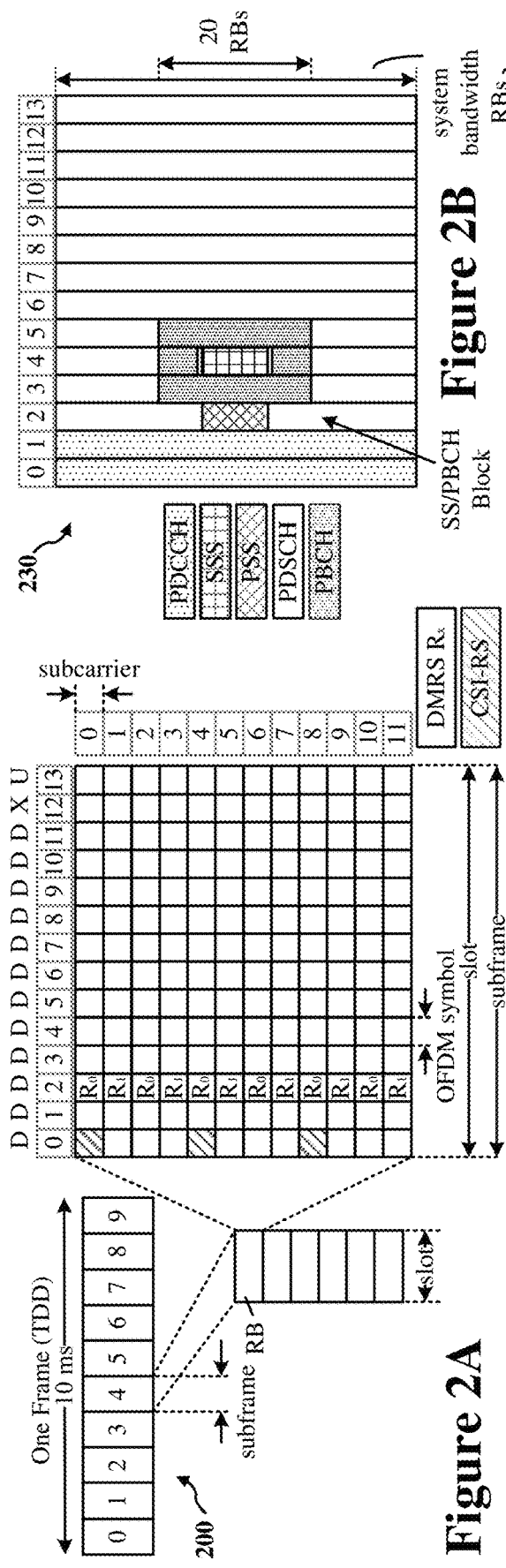
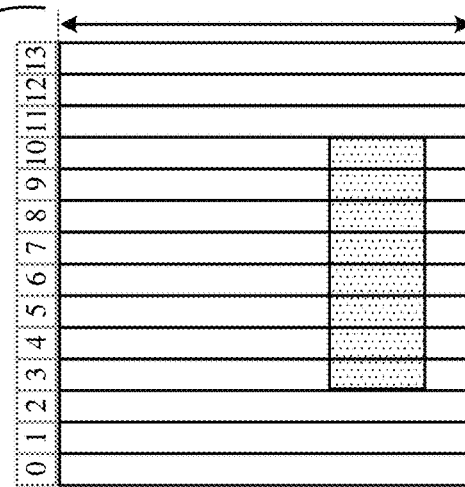
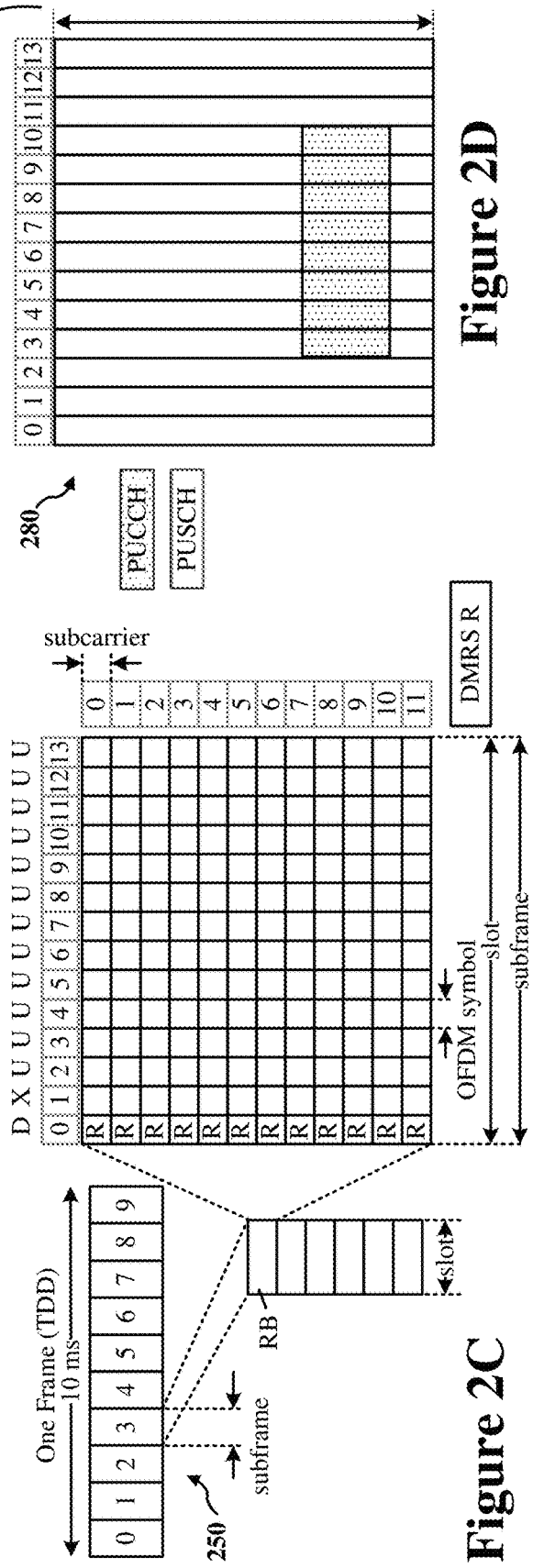
Figure 2A  Figure 2B  Figure 2C  Figure 2D

1000

```
┌─────────────────────────────────────────────────────────────┐
│  Transmitting a PDCCH to a plurality of UEs, where the PDCCH │
│  carries scheduling information indicating a first beam      │
│  associated with a PDSCH to be multicast to the plurality of │
│  UEs and a timing offset between the PDCCH and the PDSCH.    │
│  (1002)                                                      │
└─────────────────────────────────────────────────────────────┘
                            │
                            ▼
┌─────────────────────────────────────────────────────────────┐
│  Selecting at least one of the first beam or a second beam   │
│  to be used for transmitting the PDSCH based on the timing   │
│  offset between the PDCCH and the PDSCH. (1004)              │
└─────────────────────────────────────────────────────────────┘
                            │
                            ▼
┌─────────────────────────────────────────────────────────────┐
│  Transmitting the PDSCH to the plurality of UEs on the       │
│  selected at least one beam. (1006)                          │
└─────────────────────────────────────────────────────────────┘
```

Figure 10

BEAMFORMING IN MULTICAST COMMUNICATIONS

CROSS-REFERENCE TO RELATED APPLICATIONS

This Patent Application claims priority to U.S. Provisional Patent Application No. 62/938,105 entitled "BEAMFORMING IN MULTICAST COMMUNICATIONS" and filed on Nov. 20, 2019, which is assigned to the assignee hereof. The disclosure of the prior Application is considered part of and are incorporated by reference in this Patent Application.

TECHNICAL FIELD

This disclosure relates generally to wireless communication and, more specifically, to beamforming configurations for transmitting and receiving multicast communications.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR), which is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard.

Advancements in 5G NR include beamforming and utilization of the extremely high frequency (EHF) or millimeter wave (mmW) spectrum (30-300 GHz). Transmitting devices use transmit (TX) beamforming techniques to focus the energy of wireless signals in the direction of one or more receiving devices. The receiving devices use receive (RX) beamforming techniques to tune their receive antennas in the direction of the beams transmitted by the transmitting device. The focused beam greatly improves the signal-to-interference-plus-noise ratio (SINR) of communications between the transmitting device and the receiving device. In mmW communications, beamforming is highly directional to compensate for the extremely high path loss and short range. In other words, each beam may be narrowly focused in a given direction. Accordingly, TX beamforming needs to be precisely configured in conjunction with RX beamforming to establish a communications channel between the transmitting device and the receiving device.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method may be performed by a user equipment (UE), and may include receiving a physical downlink control channel (PDCCH) from a base station, where the PDCCH carries scheduling information for a physical downlink shared channel (PDSCH) to be multicast to a plurality of UEs including the UE; determining a first beam associated with the PDSCH and a delay between the PDCCH and the PDSCH based on the scheduling information; and tuning a plurality of receive antennas to receive the PDSCH on the first beam or a second beam based on the determined delay between the PDCCH and the PDSCH.

In some implementations, the method may further include determining that the PDSCH carries multicast data based on a control resource set (CORESET) associated with the PDCCH. In some other implementations, the method may further include identifying a cyclic redundancy check (CRC) sequence in the PDCCH; determining that the CRC sequence is scrambled with a group identifier associated with the plurality of UEs; and determining that the PDSCH carries multicast data based on determining that the CRC sequence is scrambled with the group identifier.

In some implementations, the method may further include determining the second beam based on a CORESET associated with the PDCCH. In some other implementations, the method may further include receiving a radio resource control (RRC) message or a medium access control (MAC) control element (CE) from the base station prior to receiving the PDCCH; and determining the second beam based on information carried in the RRC message or the MAC CE. In some implementations, the second beam is different than a default beam associated with unicast transmissions by the base station to the UE.

In some implementations, the tuning of the plurality of receive antennas may include determining whether the delay between the PDCCH and the PDSCH exceeds a threshold duration, where the plurality of receive antennas are tuned to the first beam based on determining that the delay exceeds the threshold duration, and where the plurality of receive antennas are tuned to the second beam based on determining that the delay does not exceed the threshold duration. In some implementations, the threshold duration is based on a duration associated with tuning the plurality of receive antennas to receive unicast transmissions from the base station. In some other implementations, the threshold duration is different than a duration associated with tuning the receive antennas to receive unicast transmissions from the base station. In some implementations, the method may further include receiving at least one of an RRC message or a downlink control information (DCI) message from the base station; and determining the threshold duration based on information carried in the RRC message or the DCI message.

Another innovative aspect of the subject matter described in this disclosure can be implemented in a UE. In some implementations, the UE may include at least one modem, at least one processor communicatively coupled with the at least one modem, and at least one memory communicatively coupled with the at least one processor and storing processor-readable code. In some implementations, execution of the processor-readable code by the at least one processor causes the UE to perform operations including receiving a PDCCH from a base station, where the PDCCH carries scheduling information for a PDSCH to be multicast to a plurality of UEs including the UE; determining a first beam associated with the PDSCH and a delay between the PDCCH and the PDSCH based on the scheduling information; and tuning a plurality of receive antennas to receive the PDSCH on the first beam or a second beam based on the determined delay between the PDCCH and the PDSCH.

Another innovative aspect of the subject matter described in this disclosure can be implemented as a method of wireless communication. The method may be performed by a base station, and may include transmitting a PDCCH to a plurality of UEs, where the PDCCH carries scheduling information indicating a first beam associated with a PDSCH to be multicast to the plurality of UEs and a timing offset between the PDCCH and the PDSCH; selecting at least one of the first beam or a second beam to be used for transmitting the PDSCH based on the timing offset between the PDCCH and the PDSCH; and transmitting the PDSCH to the plurality of UEs on the selected at least one beam.

In some implementations, the method may further include generating a CRC sequence associated with the PDCCH; and scrambling the CRC sequence with a group identifier associated with the plurality of UEs, where the scrambled CRC sequence is transmitted in the PDCCH. In some implementations, the method may further include determining the second beam based on a CORESET associated with the PDCCH. In some implementations, the second beam is different than a default beam associated with unicast transmissions to any of the plurality of UEs In some implementations, the selecting of at least one of the first beam or the second beam may include determining whether the timing offset exceeds a multicast scheduling threshold associated with the plurality of UEs, where the first beam is selected based on determining that the timing offset exceeds the multicast scheduling threshold, and where the second beam is selected based on determining that the timing offset does not exceed the multicast scheduling threshold. In some implementations, the method may further include determining, for each of the plurality of UEs, a respective duration associated with tuning a plurality of receive antennas to receive unicast transmissions from the base station; and configuring the multicast scheduling threshold to be at least equal to the longest of the determined durations for the plurality of UEs.

In some implementations, the selecting of at least one of the first beam or the second beam includes determining, for each of the plurality of UEs, a respective duration associated with tuning a plurality of receive antennas to receive unicast transmissions from the base station; and determining whether the timing offset exceeds the determined duration for each of the plurality of UEs, where at least the first beam is selected based on determining that the timing offset exceeds the determined duration for at least one of the plurality of UEs. In some implementations, the second beam is selected based on determining that the timing offset does not exceed the determined duration for a first UE of the plurality of UEs, where the second beam is a default beam associated with unicast transmissions from the base station to the first UE. In some implementations, the method further includes configuring the timing offset to be at least equal to the longest of the determined durations for the plurality of UEs.

Another innovative aspect of the subject matter described in this disclosure can be implemented in a base station. In some implementations, the base station may include at least one modem, at least one processor communicatively coupled with the at least one modem, and at least one memory communicatively coupled with the at least one processor and storing processor-readable code. In some implementations, execution of the processor-readable code by the at least one processor causes the base station to perform operations including transmitting a PDCCH to a plurality of UEs, where the PDCCH carries scheduling information indicating a first beam associated with a PDSCH to be multicast to the plurality of UEs and a timing offset between the PDCCH and the PDSCH; selecting at least one of the first beam or a second beam to be used for transmitting the PDSCH based on the timing offset between the PDCCH and the PDSCH; and transmitting the PDSCH to the plurality of UEs on the selected at least one beam.

BRIEF DESCRIPTION OF THE DRAWINGS

FIGS. 2A, 2B, 2C, and 2D show examples of a first 5G/NR frame, downlink (DL) channels within a 5G/NR slot, a second 5G/NR frame, and uplink (UL) channels within a 5G/NR slot, respectively.

FIG. 10 shows a flowchart illustrating an example process for wireless communication that supports beamforming in multicast communications according to some other implementations.

DETAILED DESCRIPTION

Figure 1:
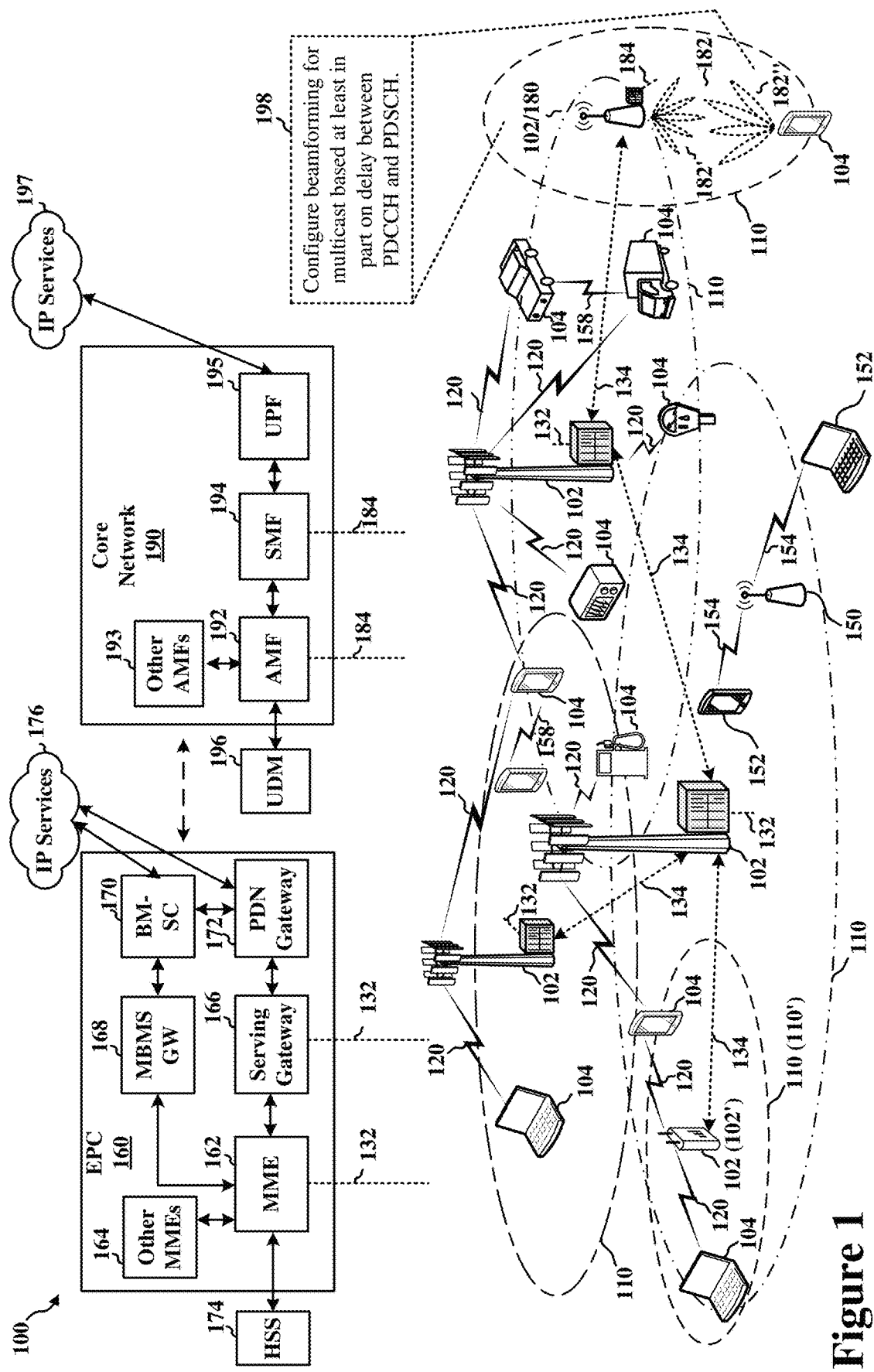
FIG. 1 shows a diagram of an example wireless communications system and an access network.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Long Term Evolution (LTE), 3G, 4G or 5G (New Radio (NR)) standards promulgated by the 3rd Generation Partnership Project (3GPP), the Institute of Electrical and Electronics Engineers (IEEE) 802.11 standards, the IEEE 802.15 standards, or the Bluetooth® standards as defined by the Bluetooth Special Interest Group (SIG), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless wide area network (WWAN), a wireless personal area network (WPAN), a wireless local area network (WLAN), or an internet of things (IOT) network.

Advancements in 5G NR include beamforming and utilization of the extremely high frequency (EHF) or millimeter wave (mmW) spectrum (30-300 GHz). In mmW communications, beamforming is highly directional to compensate for the extremely high path loss and short range. In addition to being used for unicast communications, beamforming may also be used for multicast (also referred to as "groupcast") or broadcast communications. For example, a transmitting device may use one or more directional beams to transmit the multicast data concurrently to a group of (two or more) receiving devices. Beamforming configurations for unicast communications may not be suitable for multicast communications. For example, the beams used in unicast communications between any pair of transmitting and receiving devices may vary in width or directionality from any beams that may be used in multicast communications between the same pair of devices. Accordingly, TX beamforming needs to be precisely configured in conjunction with RX beamforming to enable multicast communications between a transmitting device and a group of receiving devices.

Various aspects relate generally to beamforming configurations for multicast communications. Some aspects more particularly relate to scheduling multicast data to be transmitted on a default beam or a particular beam configured for the multicast transmission (referred to herein as a "multicast beam"). In various aspects, a transmitting device, such as a base station, may use beamforming to transmit multicast data to a plurality of devices, concurrently, via a physical downlink shared channel (PDSCH). The PDSCH may be preceded by a physical downlink control channel (PDCCH) that provides scheduling information for the PDSCH, including an identification of a multicast beam associated with the PDSCH and a timing offset or delay between the PDCCH and the PDSCH. A receiving device, such as a user equipment (UE), may determine that the PDSCH contains multicast data based at least in part on an indication in the PDCCH. To receive the multicast PDSCH, the UE may tune a plurality of its antennas in a direction of the scheduled multicast beam or in a direction of a default beam based on the delay between the PDCCH and the PDSCH. For example, the UE may tune its antennas to the scheduled multicast beam if the delay between the PDCCH and the PDSCH exceeds a scheduling threshold. On the other hand, the UE may tune its antennas to the default beam if the delay between the PDCCH and the PDSCH does not exceed the scheduling threshold. The scheduling threshold may correspond to a duration needed for the UE to configure (or tune) a plurality of receive antennas to receive a given beam.

Particular implementations of the subject matter described in this disclosure can be implemented to realize one or more of the following potential advantages. In some implementations, the described techniques can be used to transmit multicast data concurrently to multiple UEs. By signaling, via a PDCCH, that a scheduled PDSCH carries multicast data, aspects of the present disclosure enable each UE in a group to tune its receive antennas in a direction of a multicast beam (indicated in the PDCCH) or a common default beam associated with multicast communications. For example, the common default beam may be better suited for multicast communications between a base station and the group of UEs than the default beam used by any individual UE for unicast communications with the base station. In some aspects, upon determining that the scheduled PDSCH carries multicast data, each UE in the group may compare the delay between the PDCCH and the PDSCH with a common (or multicast) scheduling threshold to determine whether to tune its receive antennas in the direction of the multicast beam or the common default beam. For example, the common scheduling threshold may be longer than the amount of time needed for any individual UE to tune its receive antennas in the direction of the multicast beam. This enables the group of UEs to collectively receive the PDSCH (carrying multicast data) on the multicast beam or the common default beam.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 shows a diagram of an example wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180, may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as a millimeter wave or mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in some aspects, the base station 102/180 may utilize beamforming 182 to transmit the same downlink (DL) data to a group of UEs 104, concurrently. The DL data may be included in a physical downlink shared channel (PDSCH) that is multicast to each UE 104 in the group. The PDSCH may be preceded by a physical downlink control channel (PDCCH). In some implementations, the base station 102/180 and UEs 104 may configure the beamforming 182 for the multicast PDSCH based at least in part on the delay between the PDCCH and the PDSCH (198). More specifically, the base station 102/180 may selectively transmit the PDSCH on a scheduled multicast beam or one or more default beams depending on whether the delay between the PDCCH and the PDSCH exceeds a scheduling threshold associated with one or more of the UEs 104 in the group. Similarly, each UE 104 may tune its antennas to receive the PDSCH on the scheduled multicast beam or a default beam depending on whether the delay between the PDCCH and the PDSCH exceeds its scheduling threshold. The scheduling threshold may correspond to a duration needed for the UE 104 to configure (or tune) a plurality of receive antennas to receive a given beam.

FIG. 2A shows an example of a first slot 200 within a 5G/NR frame structure. FIG. 2B shows an example of DL channels 230 within a 5G/NR slot. FIG. 2C shows an example of a second slot 250 within a 5G/NR frame structure. FIG. 2D shows an example of UL channels 280 within a 5G/NR slot. The 5G/NR frame structure may be FDD in which, for a particular set of subcarriers (carrier system bandwidth), slots within the set of subcarriers are dedicated for either DL or UL In other cases, the 5G/NR frame structure may be TDD in which, for a particular set of subcarriers (carrier system bandwidth), slots within the set of subcarriers are dedicated for both DL and UL. In the examples shown in FIGS. 2A and 2C, the 5G/NR frame structure is configured as TDD, with slot 4 being configured with slot format 28 (with mostly DL), where D indicates DL, U indicates UL, and X indicates that the slot is flexible for use between DL/UL, and slot 3 being configured with slot format 34 (with mostly UL). While slots 3 and 4 are shown with slot formats 34 and 28, respectively, any particular slot may be configured with any of the various available slot formats 0-61. Slot formats 0 and 1 are all DL and all UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). This format may also apply to a 5G/NR frame structure that is FDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu*15$ kKz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as a physical RB (PRB)) that extends across 12 consecutive subcarriers and across a number of symbols. The intersections of subcarriers and symbols of the RB define multiple resource elements (REs). The number of bits carried by each RE depends on the modulation scheme.

As illustrated in FIG. 2A, some of the REs carry a reference (pilot) signal (RS) for the UE. In some configurations, one or more REs may carry a demodulation RS (DM-RS) (indicated as Rx for one particular configuration, where 100x is the port number, but other DM-RS configurations are possible). In some configurations, one or more REs may carry a channel state information reference signal (CSI-RS) for channel measurement at the UE. The REs may also include a beam measurement RS (BRS), a beam refinement RS (BRRS), and a phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe or symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
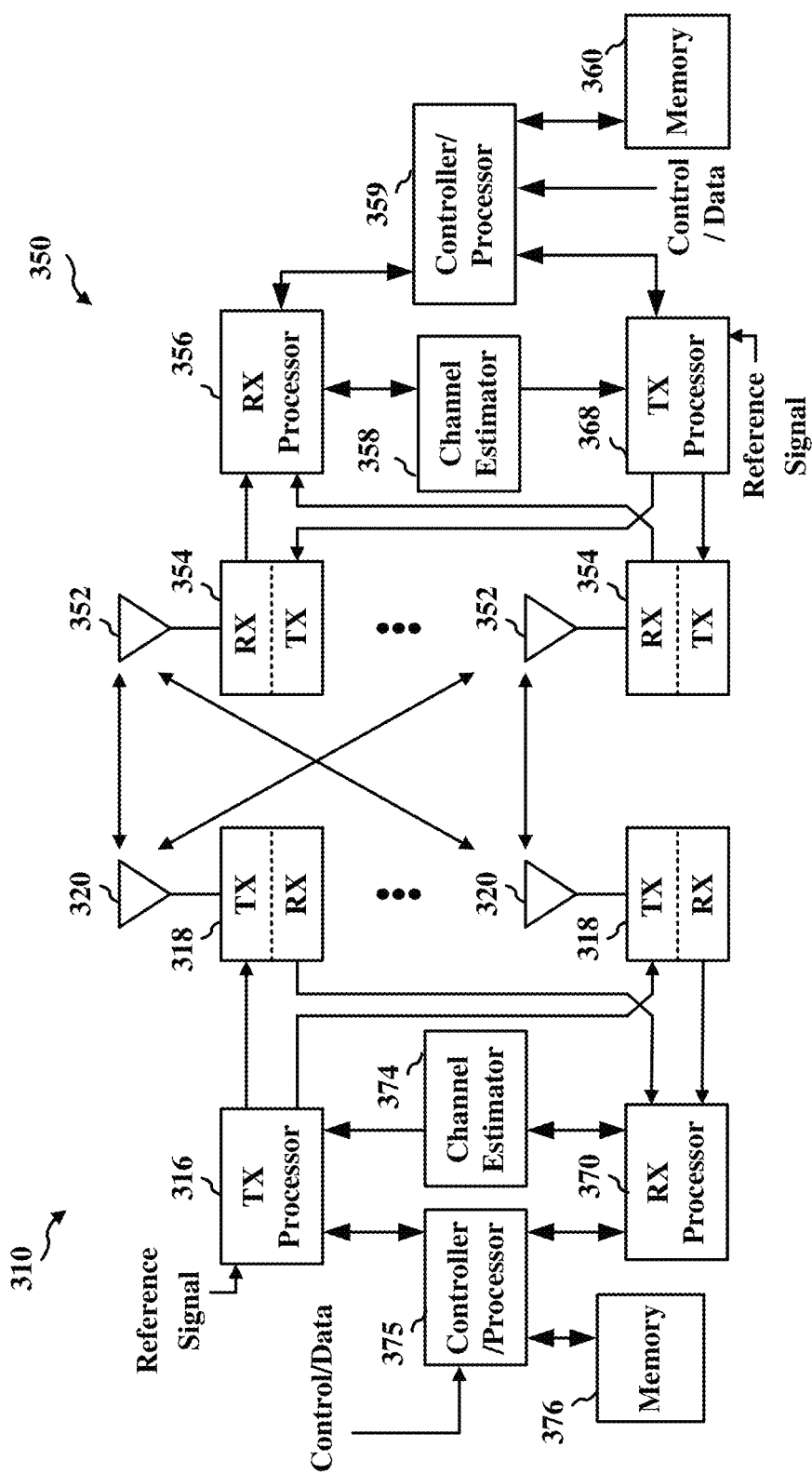
FIG. 3 shows a block diagram of an example base station and user equipment (UE) in an access network.

FIG. 3 shows a block diagram of an example base station 310 and UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/ demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially pre-coded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/ processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations. Information to be wirelessly communicated (such as for LTE or NR based communications) is encoded and mapped, at the PHY layer, to one or more wireless channels for transmission.

Various aspects relate generally to beamforming configurations for multicast communications. Some aspects more particularly relate to scheduling multicast data to be transmitted on a default beam or a particular beam configured for the multicast transmission (referred to herein as a "multicast beam"). In various aspects, a transmitting device, such as a base station, may use beamforming to transmit multicast data to a plurality of devices, concurrently, via a physical downlink shared channel (PDSCH). The PDSCH may be preceded by a physical downlink control channel (PDCCH) that provides scheduling information for the PDSCH, including an identification of a multicast beam associated with the PDSCH and a timing offset or delay between the PDCCH and the PDSCH. A receiving device, such as a user equipment (UE), may determine that the PDSCH contains multicast data based at least in part on an indication in the PDCCH. To receive the multicast PDSCH, the UE may tune a plurality of its antennas in a direction of the scheduled multicast beam or in a direction of a default beam based on the delay between the PDCCH and the PDSCH. For example, the UE may tune its antennas to the scheduled multicast beam if the delay between the PDCCH and the PDSCH exceeds a scheduling threshold. On the other hand, the UE may tune its antennas to the default beam if the delay between the PDCCH and the PDSCH does not exceed the scheduling threshold. The scheduling threshold may correspond to a duration needed for the UE to configure (or tune) a plurality of receive antennas to receive a given beam.

In some implementations, the default beam may be a default beam used by the UE 104 to receive unicast transmissions. For example, different UEs 104 may have different default beams. In some other implementations, the default beam may be different than the default beam used by the UE 104 to receive unicast transmissions. For example, the default beam may be specifically configured for multicast communications and may be common to all UEs 104 in a multicast group. In some aspects, the default beam may correspond to the beam on which the scheduling information for the PDSCH is transmitted. In some other aspects, the default beam may be determined by the base station and signaled to the UEs 104 prior to the transmission of the PDSCH.

In some implementations, the scheduling threshold may be a scheduling threshold implemented by the UE 104 when receiving unicast transmissions. For example, different UEs 104 may have different scheduling thresholds. In some other implementations, the scheduling threshold may be different than the scheduling threshold implemented by the UE 104 when receiving unicast transmissions. For example, the scheduling threshold may be specifically configured for multicast communications and may be common to all UEs 104 in a multicast group. In some aspects, the scheduling threshold may be a predefined value (such as defined by the 3GPP standards) supported by any UE capable of multicast beamforming. In some other aspects, the scheduling threshold may be determined by the base station and signaled to the UEs 1104 prior to the transmission of the PDSCH.

Particular implementations of the subject matter described in this disclosure can be implemented to realize one or more of the following potential advantages. In some implementations, the described techniques can be used to transmit multicast data concurrently to multiple UEs. By signaling, via a PDCCH, that a scheduled PDSCH carries multicast data, aspects of the present disclosure enable each UE in a group to tune its receive antennas in a direction of a multicast beam (indicated in the PDCCH) or a common default beam associated with multicast communications. For example, the common default beam may be better suited for multicast communications between a base station and the group of UEs than the default beam used by any individual UE for unicast communications with the base station. In some aspects, upon determining that the scheduled PDSCH carries multicast data, each UE in the group may compare the delay between the PDCCH and the PDSCH with a common (or multicast) scheduling threshold to determine whether to tune its receive antennas in the direction of the multicast beam or the common default beam. For example, the common scheduling threshold may be longer than the amount of time needed for any individual UE to tune its receive antennas in the direction of the multicast beam. This enables the group of UEs to collectively receive the PDSCH (carrying multicast data) on the multicast beam or the common default beam.

Figure 4A:
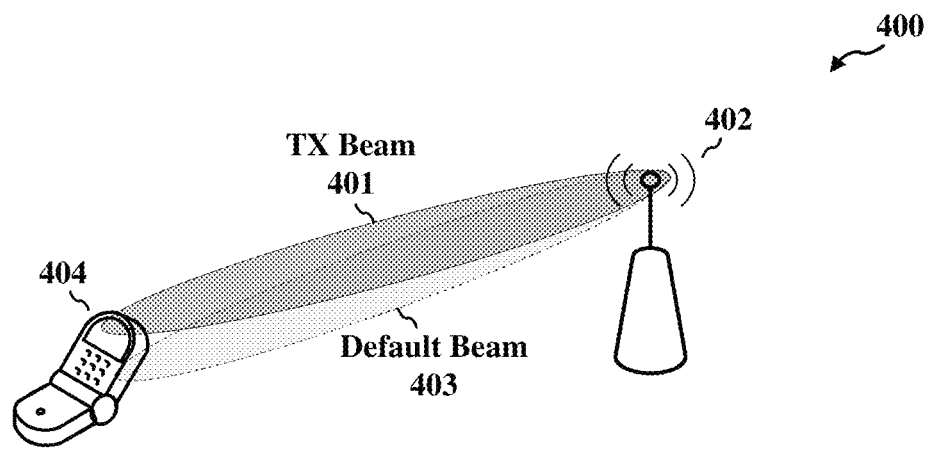
FIG. 4A shows an example wireless communications system configured for unicast transmissions.

FIG. 4A shows an example wireless communications system 400 configured for unicast transmissions. The wireless communications system 400 includes a base station 402 and a UE 404. The wireless communications system 400 may be an example implementation of the wireless communications system 100 of FIG. 1. Thus, the base station 402 and UE 404 may be example implementations of any of the base stations 102/180 and UEs 104, respectively. Although just one base station 402 and one UE 404 are shown in the example of FIG. 4A, the wireless communications system 400 may include any number of base stations and any number of UEs in actual implementations.

As shown in FIG. 4A, the base station 402 and UE 404 may be configured for unicast communications using beamforming. For example, the base station 402 may transmit DL data to the UE 404 via a transmit (TX) beam 401. In some aspects, the TX beam 401 may be narrowly focused in the direction of the UE 404 to compensate for the high path loss and short range of mmW communications. The base station 402 may configure the TX beam 401 based on channel state information (CSI) acquired from the UE 404 through sounding. Thus, the TX beam 401 may be optimized for the channel conditions associated with the UE 404. To receive the DL data, the UE 404 may tune a plurality of receive antennas in a direction of the TX beam 401. For example, the signal received by each antenna may be amplified by a different weight depending on the width and directionality of the TX beam 401.

The tuning or configuring of the receive antennas consumes time and resources. In some instances, the UE 404 may not have enough time to tune its receive antennas in the direction of the TX beam 401 after identification of the TX beam 401. When the UE 404 is unable to configure (or reconfigure) its antennas in time to receive the TX beam 401, the UE 404 may instead tune its receive antennas to a default beam 403. The direction of the default beam 403 may be known to both the base station 402 and the UE 404 prior to the transmission of DL data. Accordingly, the base station 402 may transmit the DL data on the default beam 403 if it determines that the UE 404 cannot tune its receive antennas to the direction of the TX beam 401 in time to receive the DL data. Unlike the TX beam 401, the default beam 403 may not be optimized for the channel conditions of the wireless communications system 400.

Figure 4B:
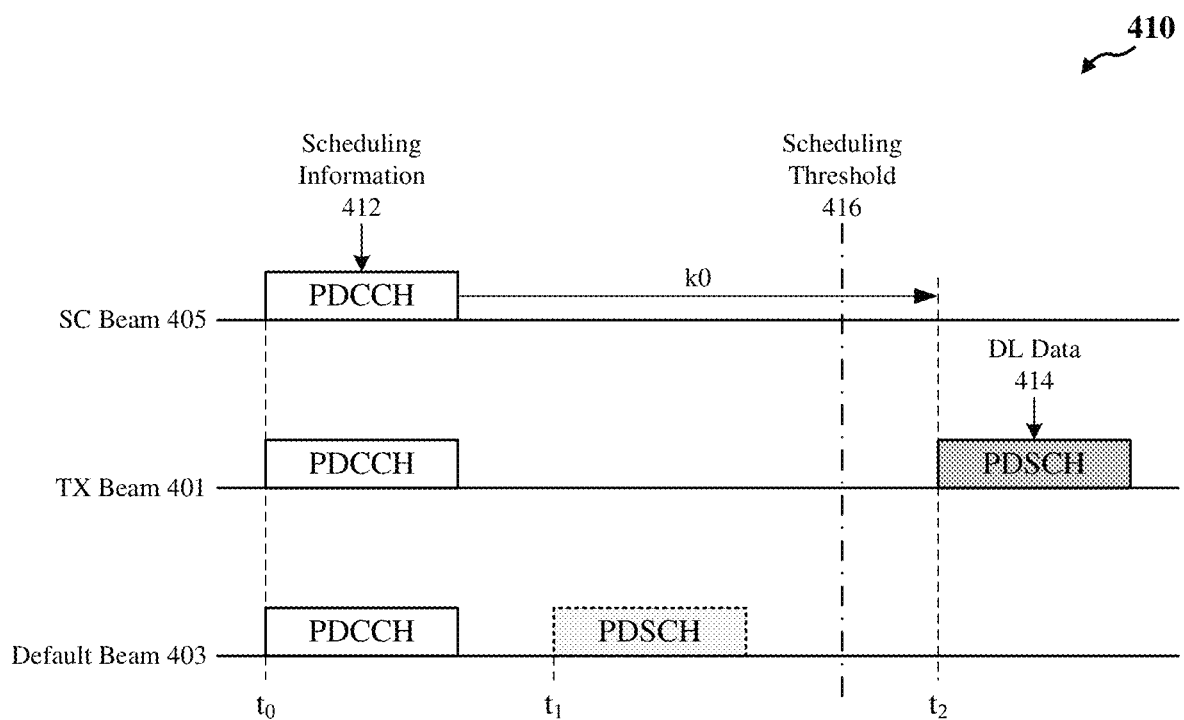
FIG. 4B shows a timing diagram illustrating an example unicast communication between a base station and a UE.

FIG. 4B shows a timing diagram illustrating an example unicast communication 410 between a base station and a UE. With reference for example to FIG. 4A, the unicast communication 410 may be performed between the base station 402 and the UE 404. At time $t_0$, the base station 402 transmits a PDCCH to the UE 404. The PDCCH includes scheduling information 412 for a subsequent PDSCH carrying DL data 414 for the UE 404. In the example of FIG. 4B, the scheduling information 412 is transmitted on a scheduling (SC) beam 405. The scheduling beam 405 may be the same or different than the TX beam 401 or the default beam 403. The scheduling information 412 may identify the TX beam 401 and indicate a delay or timing offset (k0) between the PDCCH and the PDSCH. The UE 404 compares the timing offset k0 with a scheduling threshold 416 to determine whether to tune its receive antennas to the TX beam 401 or the default beam 403.

As described above, the scheduling threshold 416 may correspond to the amount of time needed by the UE 404 to tune its receive antennas to the TX beam 401. Thus, if the timing offset k0 exceeds the scheduling threshold 416 (such as where the PDSCH arrives at time $t_2$), the UE 404 may tune its receive antennas to the TX beam 401. If the timing offset k0 does not exceed the scheduling threshold 416 (such as where the PDSCH arrives at time $t_1$), the UE 404 may tune its receive antennas to the default beam 403. In the example of FIG. 4B, the PDSCH is scheduled to arrive at time $t_2$ (after the scheduling threshold 416) and thus the UE 404 may tune its receive antennas to the TX beam 401. The base station 402 may determine the scheduling threshold 416 of the UE 402 based on information carried in a capability report received prior to the transmission of the PDCCH and also may determine that the UE 404 is capable of receiving the PDSCH on the TX beam 401. Accordingly, the base station 402 may transmit the PDSCH, using beamforming, on the TX beam 401.

Figure 5A:
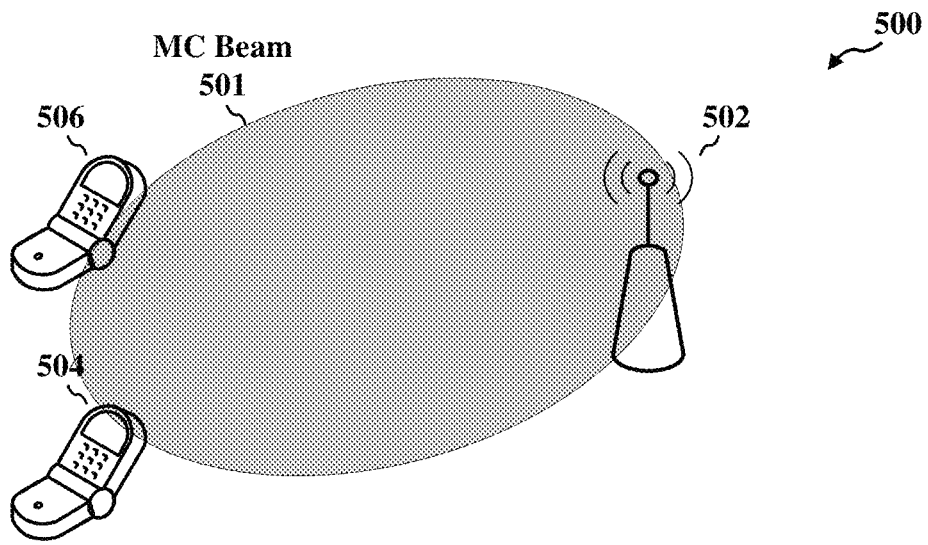
FIG. 5A shows an example wireless communications system configured for multicast transmissions according to some implementations.

FIG. 5A shows an example wireless communications system 500 configured for multicast transmissions according to some implementations. The wireless communications system 500 includes a base station 502 and multiple UEs 504 and 506. The wireless communications system 500 may be an example implementation of the wireless communications system 100 of FIG. 1. Thus, the base station 502 may be an example implementation of any of the base stations 102/180 and each of the UEs 504 and 506 may be an example implementation of any of the UEs 104. Although just one base station 502 and two UEs 504 and 506 are shown in the example of FIG. 5A, the wireless communications system 500 may include any number of base stations and any number of UEs in actual implementations.

As shown in FIG. 5A, the base station 502 and UEs 504 and 506 may be configured for multicast (or broadcast) communications using beamforming. For example, the base station 502 may transmit DL data to the UEs 504 and 506 via a multicast (MC) beam 501. In the example of FIG. 5A, a relatively wide MC beam 501 is used to focus the DL data in the broad direction of both UEs 504 and 506. In some implementations, the base station 502 may configure the MC beam 501 based on CSI acquired from each of the UEs 504 and 506 through sounding. Thus, the MC beam 501 may be optimized for the channel conditions associated with the group of UEs 504 and 506. To receive the DL data, each of the UEs 504 and 506 may tune its receive antennas in a direction of the MC beam 501. Using MC beams to multicast DL data to the group of UEs 504 and 506, concurrently, significantly reduces the signaling overhead of the wireless communications system 500 (compared to unicast transmissions to each of the UEs 504 and 506, individually).

Figure 5B:
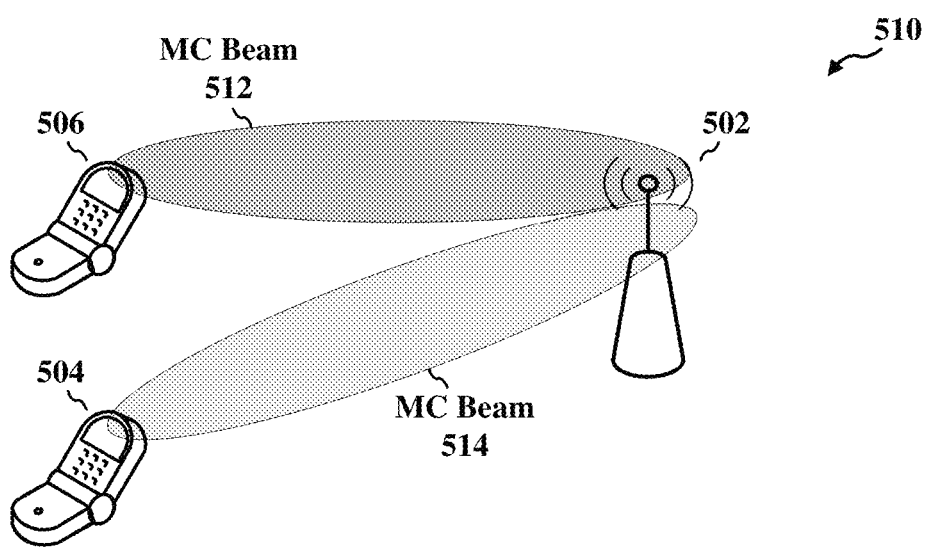
FIG. 5B shows another example wireless communications system configured for multicast transmissions according to some implementations.

FIG. 5B shows another example wireless communications system 510 configured for multicast transmissions according to some implementations. In the example of FIG. 5B, a "composite beam" is used to focus the DL data in different directions. The composite beam comprises a first MC beam 512 and a second MC beam 514. The first MC beam 512 is narrowly focused in a direction of UE 506 while the second MC beam 514 is narrowly focused in a direction of UE 504. In some implementations, the base station 502 may configure the MC beams 512 and 514 based on CSI acquired from each of the UEs 504 and 506 through sounding. Thus, MC beam 512 may be optimized for the channel conditions associated with UE 506 and MC beam 514 may be optimized for the channel conditions associated with UE 504. To receive the DL data, UE 506 may tune its receive antennas in a direction of MC beam 512 and UE 504 may tune its receive antennas in a direction of MC beam 514.

Figure 5C:
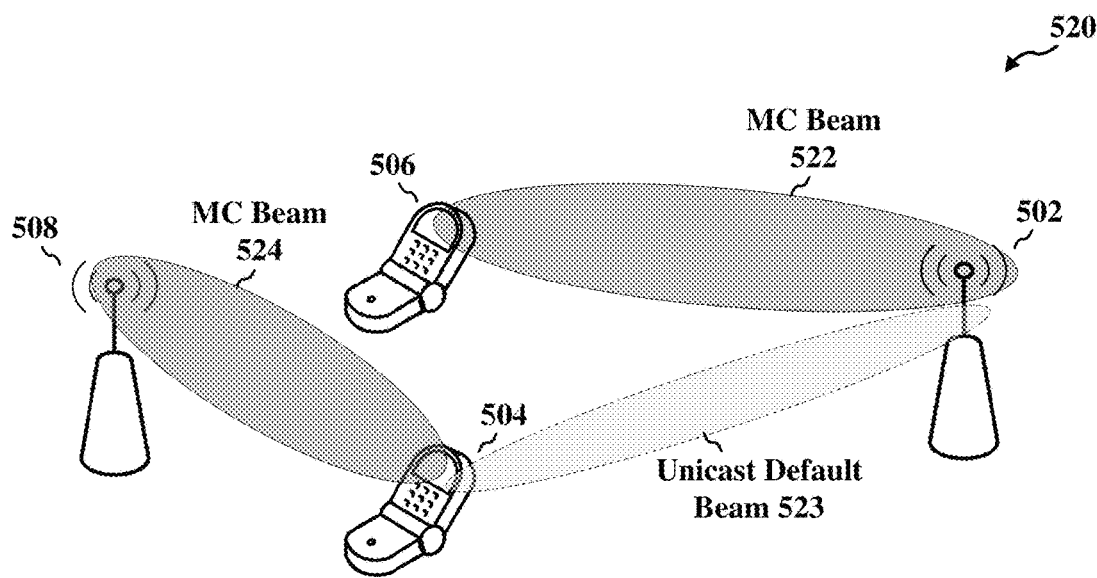
FIG. 5C shows another example wireless communications system configured for multicast transmissions according to some implementations.

FIG. 5C shows another example wireless communications system 520 configured for multicast transmissions according to some implementations. In the example of FIG. 5C, an additional transmit reception point (TRP) 508 is used to provide a coordinated multicast transmission to the group of UEs 504 and 506. More specifically, the base station 502 may transmit a narrowly focused MC beam 522 in a direction of UE 506 while the TRP 508 transmits a narrowly focused MC beam 524 in a direction of UE 504. In some implementations, the base station 502 and TRP 508 may configure the MC beams 522 and 524 based on CSI acquired from the UEs 506 and 504, respectively, through sounding. Thus, MC beam 522 may be optimized for the channel conditions associated with UE 506 and MC beam 524 may be optimized for the channel conditions associated with UE 504. To receive DL data, UE 506 may tune its receive antennas in a direction of MC beam 522 and UE 504 may tune its receive antennas in a direction of MC beam 524.

As described above, the tuning or configuring of receive antennas consumes time and resources. In some instances, a UE may not have enough time to tune its receive antennas in the direction of a particular MC beam (depending on the scheduling threshold of the UE). In such instances, it may be desirable for the UE to tune its antennas to a preconfigured default beam. However, existing 3GPP standards define a default beam configuration for unicast communications only. Aspects of the present disclosure recognize that beamforming configurations for unicast communications may not be suitable for multicast communications. For example, as shown in FIG. 5C, a default beam 523 used by UE 504 for unicast communications may be different in width and direction than the MC beam 524 transmitted to the UE 504 for multicast communications. Further, the different UEs 504 and 506 may have different scheduling thresholds. Thus, while UE 506 may be capable of receiving MC beam 522, UE 504 may not be capable of receiving MC beam 524.

In some implementations, a UE may use its scheduling threshold for unicast communications as the scheduling threshold for multicast communications. For example, different UEs belonging to the same multicast group may have different scheduling thresholds. Accordingly, the base station may schedule DL transmissions to each UE individually. In some instances, one or more UEs may receive the MC beam while other UEs may receive a default beam. In some other implementations, the UE may use a different scheduling threshold for multicast communications than the scheduling threshold it uses for unicast communications. For example, the multicast scheduling threshold may be specifically configured for multicast communications and may be common to all UEs in a multicast group. Thus, the base station may schedule DL transmissions to the UEs as a group. As a result, all UEs in a multicast group will receive either the MC beam or a default beam.

In some implementations, a UE may use its default beam for unicast communications as the default beam for multicast communications. For example, different UEs belonging to the same multicast group may have different default beams. Accordingly, the base station may transmit DL transmissions to one or more UEs individually. In some instances, the base station may be configured to transmit the DL data on multiple different default beams. In some other implementations, the UE may use a different default beam for multicast communications than the default beam it uses for unicast communications. For example, the default beam may be specifically configured for multicast communications and may be common to all UEs in a multicast group. Thus, the base station may transmit DL transmissions to the UEs as a group. As a result, all UEs in a multicast group will receive the same MC beam or default beam.

Figure 6:
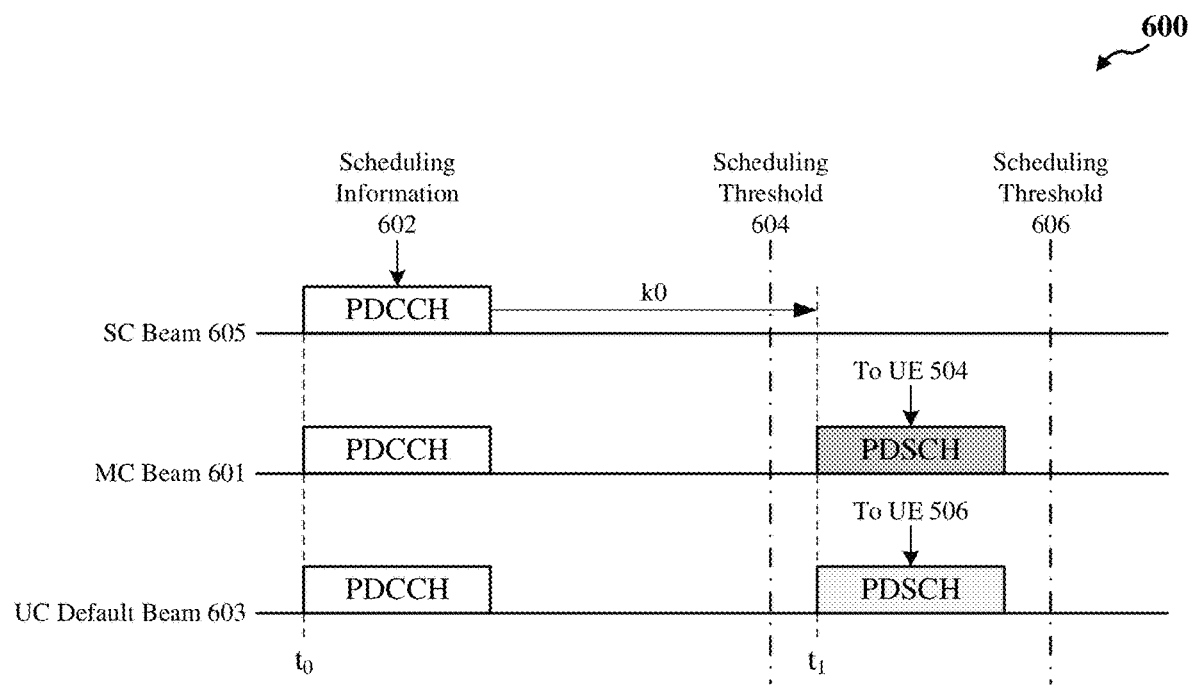
FIG. 6 shows a timing diagram illustrating an example multicast communication between a base station and a group of UEs according to some implementations.

FIG. 6 shows a timing diagram illustrating an example multicast communication 600 between a base station and a group of UEs according to some implementations. With reference for example to FIGS. 5A-5C, the multicast communication 600 may be performed between the base station 502 (or TRP 508) and a group of UEs 504 and 506. In the example of FIG. 6, the base station 502 may be configured to transmit DL data to the group of UEs 504 and 506 on a MC beam 601 or default beams 603 used by individual UEs for unicast (UC) communications. The MC beam 601 may be an example implementation of any of the MC beams 501, 512, 514, 522 or 524 of FIGS. 5A-5C.

At time $t_0$, the base station 502 transmits a PDCCH to the UEs 504 and 506. The PDCCH includes scheduling information 602 for a subsequent PDSCH carrying DL data for the group of UEs 504 and 506. In the example of FIG. 6, the scheduling information 602 is transmitted on a scheduling beam 605. The scheduling beam 605 may be the same or different than the MC beam 601 or any of the default beams 603. The scheduling information 602 may identify the MC beam 601 and indicate a delay or timing offset k0 between the PDCCH and the PDSCH. In some implementations, each of the UEs 504 and 506 may identify the PDSCH as a multicast PDSCH intended for the group of UEs 504 and 506 based on a multicast indication included in the PDCCH. In some aspects, the multicast indication may correspond to a cyclic redundancy check (CRC) of the PDCCH scrambled with a group identifier (ID) associated with the group of UEs 504 and 506 (in lieu of a UE ID associated with a particular UE).

Each of the UEs 504 and 506 compares the timing offset k0 with a respective scheduling threshold 604 and 606 to determine whether to tune its receive antennas to the MC beam 601 or the default beam 603. As described above, the scheduling thresholds 604 and 606 may correspond to the amounts of time needed by the UEs 504 and 506, respectively, to tune their receive antennas to the MC beam 601. In the example of FIG. 6, the PDSCH is scheduled to arrive at time $t_1$ (after the scheduling threshold 604 for UE 504 but before the scheduling threshold 606 for UE 506) and thus UE 504 may tune its receive antennas to the MC beam 601 while UE 506 may tune its receive antennas to the default beam 603. The base station 502 may determine the scheduling thresholds 604 and 606 of the UEs 504 and 506 based on information carried in respective capability reports received prior to the transmission of the PDCCH. Thus, the base station also may determine that UE 504 is capable of receiving the PDSCH on the MC beam 601 whereas UE 506 is not capable of receiving the PDSCH on the MC beam 601. Accordingly, the base station 502 may concurrently transmit the PDSCH, using beamforming, on the MC beam 601 and the default beam 603.

Figure 7:
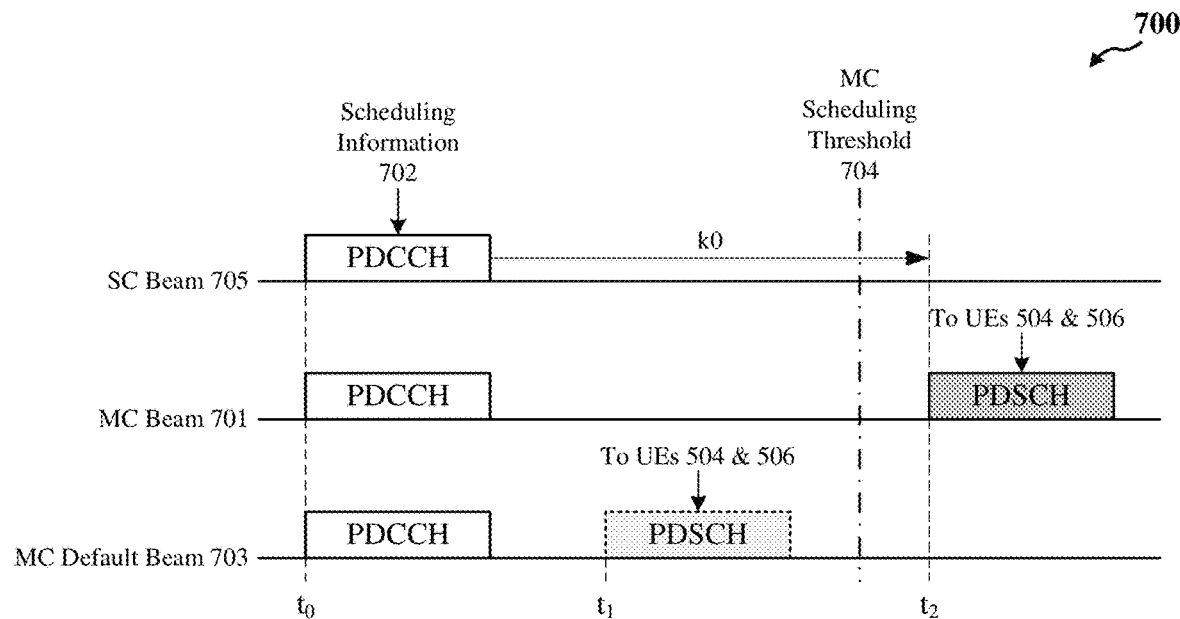
FIG. 7 shows a timing diagram illustrating another example multicast communication between a base station and a group of UEs according to some implementations.

FIG. 7 shows a timing diagram illustrating another example multicast communication 700 between a base station and a group of UEs according to some implementations. With reference for example to FIGS. 5A-5C, the multicast communication 700 may be performed between the base station 502 (or TRP 508) and a group of UEs 504 and 506. In the example of FIG. 7, the base station 502 may be configured to transmit DL data to the group of UEs 504 and 506 on a MC beam 701 or a common default beam 703 used by a group of UEs for multicast (MC) communications. The MC beam 701 may be an example implementation of any of the MC beams 501, 512, 514, 522 or 524 of FIGS. 5A-5C.

At time $t_0$, the base station 502 transmits a PDCCH to the UEs 504 and 506. The PDCCH includes scheduling information 702 for a subsequent PDSCH carrying DL data for the group of UEs 504 and 506. In the example of FIG. 7, the scheduling information 702 is transmitted on a scheduling beam 705. The scheduling beam 705 may be the same or different than the MC beam 701 or the default beam 703. The scheduling information 702 may identify the MC beam 701 and indicate a delay or timing offset k0 between the PDCCH and the PDSCH. In some implementations, each of the UEs 504 and 506 may identify the PDSCH as a multicast PDSCH intended for the group of UEs 504 and 506 based on a multicast indication included in the PDCCH. In some aspects, the multicast indication may correspond to a CRC of the PDCCH scrambled with a group ID associated with the group of UEs 504 and 506 (in lieu of a UE ID associated with a particular UE).

Each of the UEs 504 and 506 compares the timing offset k0 with a multicast (MC) scheduling threshold 704 to determine whether to tune its receive antennas to the MC beam 701 or the default beam 703. In some implementations, each of the UEs 504 and 506 may be capable of tuning its receive antennas to the MC beam 701 by the end of the MC scheduling threshold 704. In some aspects, the base station 502 may determine the MC scheduling threshold 704 based on the individual scheduling thresholds reported by each of the UEs 504 and 506. More specifically, the MC scheduling threshold 704 may be configured to be at least equal (or longer) in duration than the longest scheduling threshold reported by any of the UEs 504 or 506 in the group. The base station 502 may signal the MC scheduling threshold 704 to the UEs 504 and 506 via one or more RRC or DCI messages. In some other aspects, the MC scheduling threshold 704 may be a predefined value. For example, the MC scheduling threshold 704 may be defined by a wireless standard (such as the 3GPP standard). Thus, any wireless device (including UEs and base stations) that supports multicast beamforming is required to comply with the MC scheduling threshold 704.

As described above, the MC scheduling threshold 704 may correspond to the amount of time needed by each of the UEs 504 and 506 to tune its receive antennas to the MC beam 701. Thus, if the timing offset k0 exceeds the MC scheduling threshold 704 (such as where the PDSCH arrives at time $t_2$), the UEs 504 and 506 may tune their receive antennas to the MC beam 701. If the timing offset k0 does not exceed the MC scheduling threshold 704 (such as where the PDSCH arrives at time $t_1$), the UEs 504 and 506 may tune their receive antennas to the default beam 703. In some implementations, the base station 502 may signal or otherwise indicate the default beam 703 to the UEs 504 and 506 prior to the transmission of the PDCCH. For example, the base station 502 may signal the default beam 703 to the UEs 504 and 506 using RRC signaling and a MAC control element (MAC-CE). In the example of FIG. 7, the PDSCH is scheduled to arrive at time $t_2$ (after the MC scheduling threshold 704) and thus the UEs 504 and 506 may each tune their receive antennas to the MC beam 701. Similarly, the base station 502 may transmit the PDSCH, using beamforming, on only the MC beam 701.

Figure 8:
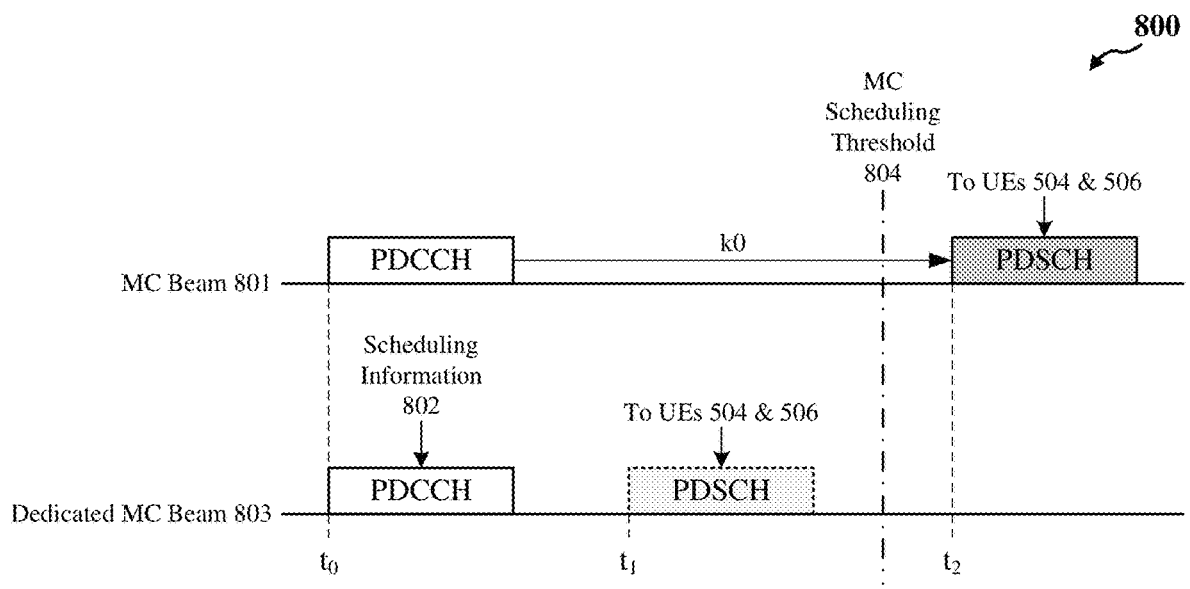
FIG. 8 shows a timing diagram illustrating another example multicast communication between a base station and a group of UEs according to some implementations.

FIG. 8 shows a timing diagram illustrating another example multicast communication 800 between a base station and a group of UEs according to some implementations. With reference for example to FIGS. 5A-5C, the multicast communication 800 may be performed between the base station 502 (or TRP 508) and a group of UEs 504 and 506. In the example of FIG. 8, the base station 502 may be configured to transmit DL data to the group of UEs 504 and 506 on a MC beam 801 or a common default beam 803 used by a group of UEs for multicast (MC) communications. The MC beam 801 may be an example implementation of any of the MC beams 501, 512, 514, 522 or 524 of FIGS. 5A-5C.

At time $t_0$, the base station 502 transmits a PDCCH to the UEs 504 and 506. The PDCCH includes scheduling information 802 for a subsequent PDSCH carrying DL data for the group of UEs 504 and 506. In the example of FIG. 8, the scheduling information 802 is transmitted on a dedicated MC beam 803. The dedicated MC beam 803 may be associated with a control resource set (CORESET) allocated specifically for multicast or broadcast communications. A CORESET describes a set of time and frequency resources associated with each beam on which the PDCCH is transmitted. In some implementations, the dedicated MC beam 803 may be associated with the CORESET having the lowest CORESET index. The scheduling information 802 may identify the MC beam 801 and indicate a delay or timing offset k0 between the PDCCH and the PDSCH. In some implementations, each of the UEs 504 and 506 may identify the PDSCH as a multicast PDSCH intended for the group of UEs 504 and 506 by detecting the scheduling information 802 on the dedicated MC beam 803.

Each of the UEs 504 and 506 compares the timing offset k0 with a multicast (MC) scheduling threshold 804 to determine whether to tune its receive antennas to the MC beam 801 or a default beam. In some implementations, the UEs 504 and 506 may detect the default beam based on a CORESET associated with the PDCCH. For example, each of the UEs 504 and 506 may use the beam on which it receives the PDCCH with the scheduling information 802 as the default beam. Thus, in some aspects, the default beam may correspond to the dedicated MC beam 803. As described above, each of the UEs 504 and 506 may be capable of tuning its receive antennas to the MC beam 801 by the end of the MC scheduling threshold 804. In some aspects, the base station 502 may determine the MC scheduling threshold 804 based on the individual scheduling thresholds reported by each of the UEs 504 and 506. The base station 502 may signal the MC scheduling threshold 804 to the UEs 504 and 506 via one or more RRC or DCI messages. In some other aspects, the MC scheduling threshold 804 may be a predefined value (such as defined by the 3GPP standards).

As described above, the MC scheduling threshold 804 may correspond to the amount of time needed by each of the UEs 504 and 506 to tune its receive antennas to the MC beam 801. Thus, if the timing offset k0 exceeds the MC scheduling threshold 804 (such as where the PDSCH arrives at time $t_2$), the UEs 504 and 506 may tune their receive antennas to the MC beam 801. If the timing offset k0 does not exceed the MC scheduling threshold 804 (such as where the PDSCH arrives at time $t_1$), the UEs 504 and 506 may tune their receive antennas to the dedicated MC beam 803. In the example of FIG. 8, the PDSCH is scheduled to arrive at time $t_2$ (after the MC scheduling threshold 804) and thus the UEs 504 and 506 may each tune their receive antennas to the MC beam 801. Similarly, the base station 502 may transmit the PDSCH, using beamforming, on only the MC beam 801.

Figure 9:
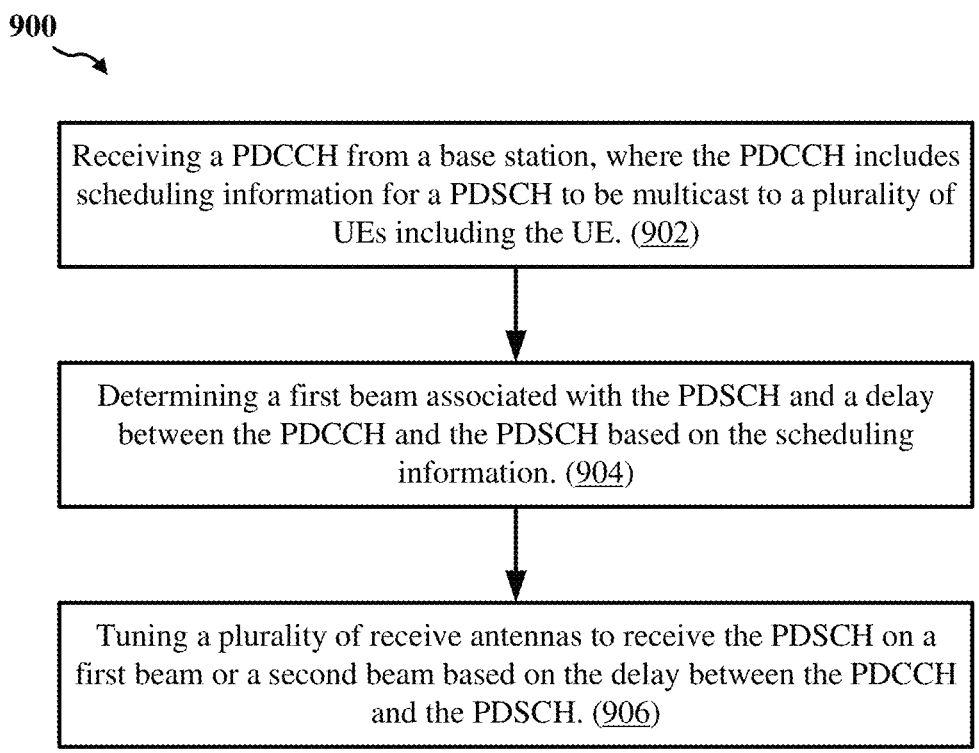
FIG. 9 shows a flowchart illustrating an example process for wireless communication that supports beamforming in multicast communications according to some implementations.

FIG. 9 shows a flowchart illustrating an example process 900 for wireless communication that supports beamforming in multicast communications according to some implementations. In some implementations, the process 900 may be performed by a wireless communication device operating as or within a UE, such as one of the UEs 104, 404, or 504 and 506 described above with reference to FIG. 1, FIG. 4A, and FIGS. 5A-5C, respectively.

In some implementations, the process 900 begins in block 902 with receiving a PDCCH from a base station, where the PDCCH includes scheduling information for a PDSCH to be multicast to a plurality of UEs including the UE. In some implementations, the PDSCH may be determined to carry multicast data based on a CORESET associated with the PDCCH. In some other implementations, the PDSCH may be determined to carry multicast data based on determining that a CRC sequence included in the PDCCH is scrambled with a group identifier associated with the plurality of UEs. In block 904, the process 900 proceeds with determining a first beam associated with the PDSCH and a delay between the PDCCH and the PDSCH based on the scheduling information. In block 906, the process 900 proceeds with tuning a plurality of receive antennas to receive the PDSCH on a first beam or a second beam based on the delay between the PDCCH and the PDSCH. In some implementations, the second beam may be different than a default beam associated with unicast transmissions by the base station to the UE. In some implementations, the second beam may be determined based on a CORESET associated with the PDCCH. In some other implementations, the second beam may be determined based on information carried in an RRC message or a MACE CE received from the base station prior to receiving the PDCCH.

In some implementations, the operation for tuning the plurality of receive antennas, in block 906, may include determining whether the delay between the PDCCH and the PDSCH exceeds a threshold duration, where the plurality of receive antennas are tuned to the first beam based on determining that the delay exceeds the threshold duration, and where the plurality of receive antennas are tuned to the second beam based on determining that the delay does not exceed the threshold duration. In some implementations, the threshold duration may be based on a duration associated with tuning the plurality of receive antennas to receive unicast transmissions from the base station. In some other implementations, the threshold duration may be different than a duration associated with tuning the receive antennas to receive unicast transmission from the base station. In some implementations, the threshold duration may be determined based on information carried in an RRC message or a DCI message received from the base station.

FIG. 10 shows a flowchart illustrating an example process 1000 for wireless communication that supports beamforming in multicast communications according to some other implementations. In some implementations, the process 1000 may be performed by a wireless communication device operating as or within a network node, such as one of the base stations 102/180, 402, or 502 and 508 described above with reference to FIG. 1, FIG. 4A, and FIGS. 5A-5C, respectively.

In some implementations, the process 1000 begins in block 1002 with transmitting a PDCCH to a plurality of UEs, where the PDCCH carries scheduling information indicating a first beam associated with a PDSCH to be multicast to the plurality of UEs and a timing offset between the PDCCH and the PDSCH. In some implementations, the PDCCH may include a CRC sequence scrambled with a group identifier associated with the plurality of UEs. In block 1004, the process 1000 proceeds with selecting at least one of the first beam or a second beam to be used for transmitting the PDSCH based on the timing offset between the PDCCH and the PDSCH. In some implementations, the second beam may be determined based on a CORESET associated with the PDCCH. In some implementations, the second beam may be different than a default beam associated with unicast transmissions to any of the plurality of UEs. In block 1006, the process 1000 proceeds with transmitting the PDSCH to the plurality of UEs on the selected at least one beam.

In some implementations, the operation for selecting at least one of the first beam or the second beam, in block 1004, may include determining whether the timing offset exceeds a multicast scheduling threshold associated with the plurality of UEs, where the first beam is selected based on determining that the timing offset exceeds the multicast scheduling threshold, and where the second beam is selected based on determining that the timing offset does not exceed the multicast scheduling threshold. In some implementations, the multicast scheduling threshold may be configured to be at least equal to the longest duration associated with tuning a plurality of receive antennas, by any of the UEs, to receive unicast transmissions from the base station.

In some other implementations, the operation for selecting at least one of the first beam or the second beam, in block 1004, may include determining, for each of the plurality of UEs, a respective duration associated with tuning a plurality of receive antennas to receive unicast transmissions from the base station; and determining whether the timing offset exceeds the determined duration for each of the plurality of UEs, where at least the first beam is selected based on determining that the timing offset exceeds the determined duration for at least one of the plurality of UEs. In some implementations, the second beam may be selected based on determining that the timing offset does not exceed the determined duration for a first UE of the plurality of UEs, where the second beam is a default beam associated with unicast transmissions from the base station to the first UE. In some implementations, the timing offset may be configured to be at least equal to the longest of the determined durations for the plurality of UEs.

Figure 11:
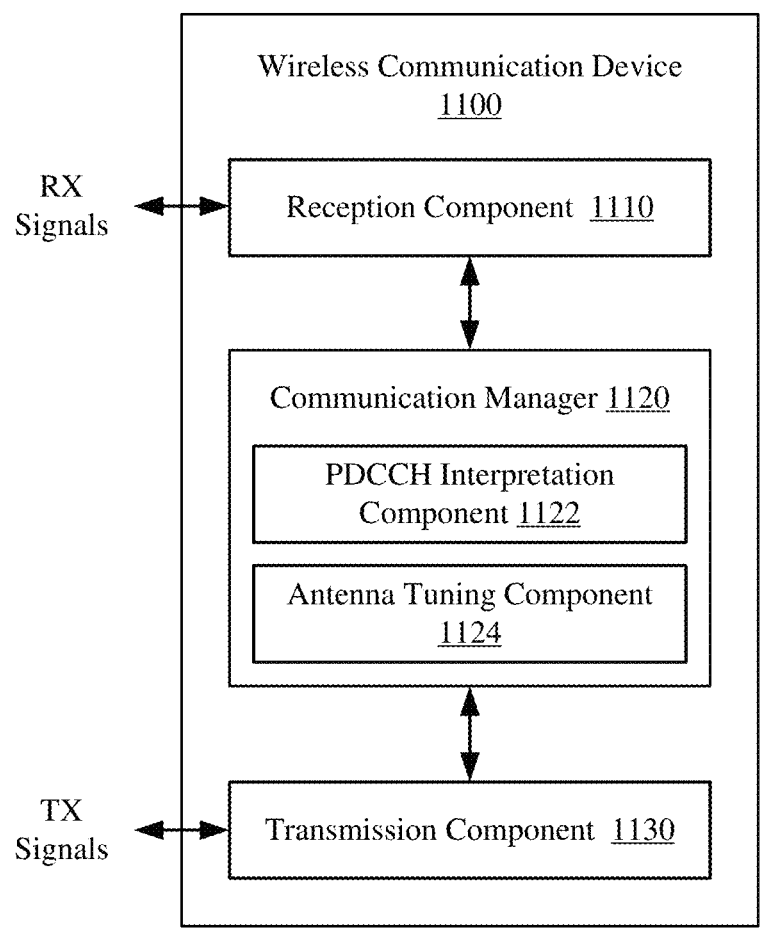
FIG. 11 shows a block diagram of an example wireless communication device according to some implementations.

FIG. 11 shows a block diagram of an example wireless communication device 1100 according to some implementations. In some implementations, the wireless communication device 1100 is configured to perform the process 900 described above with reference to FIG. 9. The wireless communication device 1100 can be an example implementation of any of the UEs 104 or 350 described above with reference to FIGS. 1 and 3, respectively. For example, the wireless communication device 1100 can be a chip, SoC, chipset, package or device that includes at least one processor and at least one modem (for example, a Wi-Fi (IEEE 802.11) modem or a cellular modem).

The wireless communication device 1100 includes a reception component 1110, a communication manager 1120, and a transmission component 1130. The communication manager 1120 further includes a PDCCH interpretation component 1122 and an antenna tuning component 1124. Portions of one or more of the components 1122 and 1124 may be implemented at least in part in hardware or firmware. In some implementations, at least some of the components 1122 or 1124 are implemented at least in part as software stored in a memory (such as the memory 360). For example, portions of one or more of the components 1122 and 1124 can be implemented as non-transitory instructions (or "code") executable by a processor (such as the controller/processor 359) to perform the functions or operations of the respective component.

The reception component 1110 is configured to receive RX signals representing DL communications from a base station. In some implementations, the RX signals may include a PDCCH carrying scheduling information for a PDSCH to be multicast to a plurality of UEs including the wireless communication device. The transmission component 1130 is configured to transmit TX signals representing UL communications to the base station. The communication manager 1120 is configured to control or manage DL and UL communications with the base station. In some implementations, the PDCCH interpretation component 1122 may determine a first beam associated with the PDSCH and a delay between the PDCCH and the PDSCH based on the scheduling information; and the antenna tuning component 1124 may tune a plurality of receive antennas to receive the PDSCH on the first beam or a second beam based on the determined delay between the PDCCH and the PDSCH.

Figure 12:
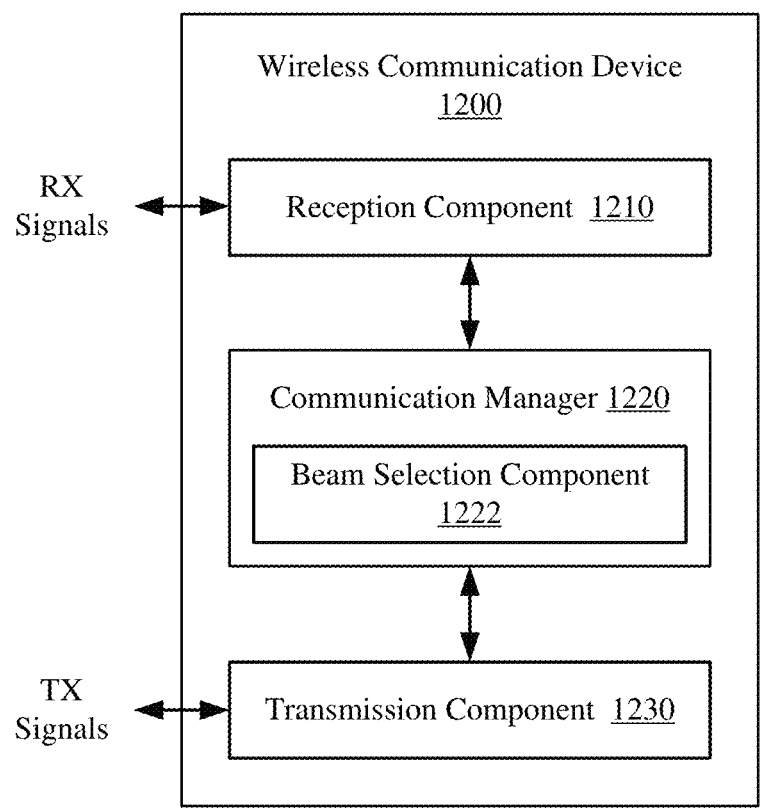
FIG. 12 shows a block diagram of an example wireless communication device according to some implementations.

FIG. 12 shows a block diagram of an example wireless communication device 1200 according to some implementations. In some implementations, the wireless communication device 1200 is configured to perform the processes 1000 described above with reference to FIG. 10. The wireless communication device 1200 can be an example implementation of any of the base stations 102 or 310 described above with reference to FIGS. 1 and 3, respectively. For example, the wireless communication device 1200 can be a chip, SoC, chipset, package or device that includes at least one processor and at least one modem (for example, a Wi-Fi (IEEE 802.11) modem or a cellular modem).

The wireless communication device 1200 includes a reception component 1210, a communication manager 1220, and a transmission component 1230. The communication manager 1220 further includes a beam selection component 1222. Portions of the beam selection component 1222 may be implemented at least in part in hardware or firmware. In some implementations, the beam selection component 1222 is implemented at least in part as software stored in a memory (such as the memory 376). For example, portions of the beam selection component 1222 can be implemented as non-transitory instructions (or "code") executable by a processor (such as the controller/processor 375) to perform the functions or operations of the respective component.

The reception component 1210 is configured to receive RX signals representing UL communications from one or more UEs. The transmission component 1230 is configured to transmit TX signals representing DL communications to the one or more UEs. In some implementations, the TX signals may include a PDCCH carrying scheduling information indicating a first beam associated with a PDSCH to be multicast to a plurality of UEs and a timing offset between the PDCCH and the PDSCH. The communication manager 1220 is configured to control or manage DL and UL communications with the one or more UEs. In some implementations, the beam selection component 1222 may select at least one of the first beam or a second beam to be used for transmitting the PDSCH based on the timing offset between the PDCCH and the PDSCH. In some implementations, the transmission component 1230 may further transmit the PDSCH to the plurality of UEs on the selected at least one beam.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method of wireless communication performed by a user equipment (UE), comprising:
   receiving a physical downlink control channel (PDCCH), the PDCCH carrying scheduling information for a physical downlink shared channel (PDSCH) to be multicast to a plurality of UEs including the UE;
   determining a first beam associated with the PDSCH and a delay between the PDCCH and the PDSCH based on the scheduling information; and
   tuning a plurality of receive antennas to receive the PDSCH on the first beam or a second beam based on the determined delay between the PDCCH and the PDSCH.

2. The method of claim 1, further comprising:
   determining that the PDSCH carries multicast data based on a control resource set (CORESET) associated with the PDCCH.

3. The method of claim 1, further comprising:
   identifying a cyclic redundancy check (CRC) sequence in the PDCCH;
   determining that the CRC sequence is scrambled with a group identifier associated with the plurality of UEs; and
   determining that the PDSCH carries multicast data based on determining that the CRC sequence is scrambled with the group identifier.

4. The method of claim 1, further comprising:
   determining the second beam based on a CORESET associated with the PDCCH.

5. The method of claim 1, further comprising:
   receiving a radio resource control (RRC) message or a medium access control (MAC) control element (CE) from a base station prior to receiving the PDCCH; and
   determining the second beam based on information carried in the RRC message or the MAC CE.

6. The method of claim 1, wherein the second beam is different than a default beam associated with unicast transmissions by a base station to the UE.

7. The method of claim 1, wherein tuning the plurality of receive antennas comprises:
   determining whether the delay between the PDCCH and the PDSCH exceeds a threshold duration, and
   tuning the plurality of receive antennas to the first beam or the second beam based on whether the delay between the PDCCH and the PDSCH exceeds the threshold duration.

8. The method of claim 7, further comprising:
   receiving at least one of an RRC message or a downlink control information (DCI) message; and
   determining the threshold duration based on information carried in the RRC message or the DCI message.

9. The method of claim 7, wherein the threshold duration is based on a duration associated with tuning the plurality of receive antennas to receive unicast transmissions.

10. The method of claim 7, wherein the threshold duration is different than a duration associated with tuning the receive antennas to receive unicast transmissions.

11. A user equipment (UE) for wireless communication, comprising:
    one or more memories; and
    one or more processors, coupled with the one or more memories, configured to cause the UE to:
      receive a physical downlink control channel (PDCCH), the PDCCH carrying scheduling information for a physical downlink shared channel (PDSCH) to be multicast to a plurality of UEs including the UE;
      determine a first beam associated with the PDSCH and a delay between the PDCCH and the PDSCH based on the scheduling information; and
      tune a plurality of receive antennas to receive the PDSCH on the first beam or a second beam based on the delay between the PDCCH and the PDSCH.

12. The UE of claim 11, wherein the one or more processors are further configured to cause the UE to:
    determine that the PDSCH carries multicast data based on a control resource set (CORESET) associated with the PDCCH.

13. The UE of claim 11, wherein the one or more processors are further configured to cause the UE to:
    identify a cyclic redundancy check (CRC) sequence in the PDCCH;
    determine that the CRC sequence is scrambled with a group identifier associated with the plurality of UEs; and
    determine that the PDSCH carries multicast data based on determining that the CRC sequence is scrambled with the group identifier.

14. The UE of claim 11, wherein the one or more processors are further configured to cause the UE to:
    determine the second beam based on a CORESET associated with the PDCCH.

15. The UE of claim 11, wherein the one or more processors are further configured to cause the UE to:

receive a radio resource control (RRC) message or a medium access control (MAC) control element (CE) prior to receiving the PDCCH; and determine the second beam based on information carried in the RRC message or the MAC CE.

16. The UE of claim 11, wherein, to tune the plurality of receive antennas, the one or more processors are configured to cause the UE to:

determine whether the delay between the PDCCH and the PDSCH exceeds a threshold duration, and tune the plurality of receive antennas to the first beam or the second beam based on determining whether the delay between the PDCCH and the PDSCH exceeds the threshold duration.

17. A method of wireless communication performed by a network node, comprising:

transmitting a physical downlink control channel (PDCCH) to a plurality of user equipment (UEs), the PDCCH carrying scheduling information indicating a first beam associated with a physical downlink shared channel (PDSCH) to be multicast to the plurality of UEs and a timing offset between the PDCCH and the PDSCH;

selecting at least one beam, of the first beam or a second beam, to be used for transmitting the PDSCH based on the timing offset between the PDCCH and the PDSCH; and transmitting the PDSCH to the plurality of UEs on the selected at least one beam.

18. The method of claim 17, further comprising:

generating a cyclic redundancy check (CRC) sequence associated with the PDCCH; and scrambling the CRC sequence with a group identifier associated with the plurality of UEs, the scrambled CRC sequence being transmitted in the PDCCH.

19. The method of claim 17, wherein selecting the at least one beam comprises:

determining whether the timing offset exceeds a multicast scheduling threshold associated with the plurality of UEs, and selecting the first beam or the second beam based on determining whether the timing offset between the PDCCH and the PDSCH exceeds the multicast scheduling threshold.

20. The method of claim 19, further comprising:

determining, for each of the plurality of UEs, a respective duration associated with tuning a plurality of receive antennas to receive unicast transmissions from the network node; and configuring the multicast scheduling threshold to be at least equal to the longest of the determined durations for the plurality of UEs.

21. The method of claim 17, further comprising:

determining the second beam based on a control resource set (CORESET) associated with the PDCCH.

22. The method of claim 17, wherein the second beam is different than a default beam associated with unicast transmissions to any of the plurality of UEs.

23. The method of claim 17, wherein selecting the at least one beam comprises:

determining, for each of the plurality of UEs, a respective duration associated with tuning a plurality of receive antennas to receive unicast transmissions, determining whether the timing offset exceeds the determined duration for each of the plurality of UEs, and selecting at least the first beam based on determining that the timing offset exceeds the determined duration for at least one of the plurality of UEs.

24. The method of claim 23, wherein selecting the at least one beam comprises:

selecting the second beam based on determining that the timing offset does not exceed the determined duration for a first UE of the plurality of UEs, the second beam being a default beam associated with unicast transmissions from the network node to the first UE.

25. The method of claim 23, further comprising:

configuring the timing offset to be at least equal to the longest of the determined durations for the plurality of UEs.

26. A network node for wireless communication, comprising:

one or more memories; and one or more processors, coupled with the one or more memories, configured to cause the network node to:

transmit a physical downlink control channel (PDCCH) to a plurality of user equipment (UEs), the PDCCH carrying scheduling information indicating a first beam associated with a physical downlink shared channel (PDSCH) to be multicast to the plurality of UEs and a timing offset between the PDCCH and the PDSCH;

select at least one beam, of the first beam or a second beam, to be used for transmitting the PDSCH based on the timing offset between the PDCCH and the PDSCH; and transmit the PDSCH to the plurality of UEs on the selected at least one beam.

27. The network node of claim 26, wherein the one or more processors are further configured to cause the network node to:

generate a cyclic redundancy check (CRC) sequence associated with the PDCCH; and scramble the CRC sequence with a group identifier associated with the plurality of UEs, the scrambled CRC sequence being transmitted in the PDCCH.

28. The network node of claim 26, wherein, to select the at least one beam, the one or more processors are configured to cause the network node to:

determine whether the timing offset exceeds a multicast scheduling threshold associated with the plurality of UEs, and select the first beam or the second beam based on determining whether the timing offset between the PDCCH and the PDSCH exceeds the multicast scheduling threshold.

29. The network node of claim 28, wherein the one or more processors are further configured to cause the network node to:

determine, for each of the plurality of UEs, a respective duration associated with tuning a plurality of receive antennas to receive unicast transmissions from the network node; and configure the multicast scheduling threshold to be at least equal to the longest of the durations for the plurality of UEs.

30. The network node of claim 26, wherein, to select the at least one beam, the one or more processors are configured to cause the network node to:

determine, for each of the plurality of UEs, a respective duration associated with tuning a plurality of receive antennas to receive unicast transmissions, determine whether the timing offset exceeds the duration for each of the plurality of UEs,
select the first beam based on determining that the timing offset exceeds the duration for at least one of the plurality of UEs, and
select the second beam based on determining that the timing offset does not exceed the duration for a first UE of the plurality of UEs,
  the second beam being a default beam associated with unicast transmissions from the network node to the first UE.

* * * * *